United States Patent
Kawamura

(10) Patent No.: US 11,727,959 B2
(45) Date of Patent: Aug. 15, 2023

(54) INFORMATION PROCESSING DEVICE AND CONTENT EDITING METHOD

(71) Applicant: SONY INTERACTIVE ENTERTAINMENT INC., Tokyo (JP)

(72) Inventor: Daisuke Kawamura, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/295,236

(22) PCT Filed: Dec. 3, 2019

(86) PCT No.: PCT/JP2019/047198
§ 371 (c)(1),
(2) Date: May 19, 2021

(87) PCT Pub. No.: WO2020/121890
PCT Pub. Date: Jun. 18, 2020

(65) Prior Publication Data
US 2022/0013147 A1   Jan. 13, 2022

(30) Foreign Application Priority Data
Dec. 10, 2018 (JP) ................. 2018-231054

(51) Int. Cl.
*G11B 27/031* (2006.01)
*A63F 13/63* (2014.01)
*H04N 21/854* (2011.01)

(52) U.S. Cl.
CPC ........... *G11B 27/031* (2013.01); *A63F 13/63* (2014.09); *H04N 21/854* (2013.01); *A63F 2300/6018* (2013.01)

(58) Field of Classification Search
CPC ........ G11B 27/03; A63F 13/63; H04N 21/854
See application file for complete search history.

(56) References Cited

U.S. PATENT DOCUMENTS

2004/0095474 A1* 5/2004 Matsufune ............. H04N 5/262
348/E5.051
2013/0311633 A1* 11/2013 Barnett ................... H04L 67/02
709/223
(Continued)

FOREIGN PATENT DOCUMENTS

JP 2011-512172 A 4/2011
JP 2015-058072 A 3/2015
(Continued)

OTHER PUBLICATIONS

International Preliminary Report on Patentability dated Jun. 24, 2021, from PCT/JP2019/047198, 11 sheets.
(Continued)

*Primary Examiner* — Mishawn N. Hunter
(74) *Attorney, Agent, or Firm* — Katten Muchin Rosenman LLP

(57) ABSTRACT

An acquisition section 104 acquires a plurality of sets of content data and stores the plurality of sets of content data in a content storage section 132. An editing processing section 110 generates a stream of continuous data obtained by temporally concatenating a plurality of sets of content data. An opening image generation section 114 generates, for each content, a set of opening image data. A clipping processing section 116 clips at least a portion of a set of content image data. A concatenating section 118 generates an edited set of image data obtained by temporally concatenating the set of opening image data and a clipped set of content image data.

7 Claims, 7 Drawing Sheets

(56) References Cited

U.S. PATENT DOCUMENTS

2019/0102140 A1* 4/2019 Bittner ............... H03G 3/3005
2019/0200064 A1* 6/2019 Louis .................... G06F 16/951

FOREIGN PATENT DOCUMENTS

| JP | 2018-182715 A | 11/2018 |
| WO | 2014068806 A1 | 5/2014 |
| WO | 2015125815 A1 | 8/2015 |

OTHER PUBLICATIONS

International Search Report and Written Opinion dated Mar. 17, 2020, from PCT/JP2019/047198, 8 sheets.
Notice of Reasons for Refusal dated Mar. 29, 2022, from Japanese Patent Application No. 2018-231054, 4 sheets.

\* cited by examiner

FIG. 7

| EDITED CONTENT A | EDITED CONTENT B | EDITED CONTENT C | EDITED CONTENT D | EDITED CONTENT E |

INFORMATION PROCESSING DEVICE AND CONTENT EDITING METHOD

TECHNICAL FIELD

The present invention relates to a technology for editing a plurality of sets of content data.

BACKGROUND ART

These days, an environment which enables a user who is playing a game to upload content, such as a screen shot and a game moving image, to a shared server and publish the content to other viewing users has been developed (see, for example, PTL 1.)

CITATION LIST

Patent Literature

[PTL 1]
PCT Patent Publication No. WO2014/068806

SUMMARY

Technical Problem

In a game network service, in response to a registration, by a user, of a specific user as a "friend" into a management server, data associated with the friend and collected by a management server is delivered to a game device of the user. Upon supply of content data having been generated by the friend to the game device of the user, the user is able to view the content having been generated by the friend. However, the delivery of a large number of sets of content in a situation in which a large number of friends exist is troublesome and time wasteful for the user who needs to select and reproduce the pieces of content one by one. Thus, the development of a technology that efficiently reproduces a plurality of sets of content data is desired.

Solution to Problem

In order to solve the above problem, an information processing device according to an aspect of the present invention includes an acquisition section that acquires a plurality of sets of content data and an editing processing section that generates a stream of continuous data obtained by temporally concatenating a plurality of sets of content data. The editing processing section includes an opening image generation section that generates, for each content, a set of opening image data, a clipping processing section that temporally clips at least a portion of each of sets of content image data, and a concatenating section that generates an edited set of image data obtained by temporally concatenating the set of opening image data and a clipped set of content image data.

Another aspect of the present invention is a method for editing a plurality of sets of content data, and the method includes a step of acquiring the plurality of sets of content data and an editing step of generating a stream of continuous data by temporally concatenating a plurality of sets of content data. The editing step includes a step of generating, for each content, a set of opening image data, a step of temporally clipping at least a portion of each of sets of content image data, and a step of generating an edited set of image data obtained by temporally concatenating the set of opening image data and a clipped set of content image data.

It should be noted that any combinations of the above constituent elements and conversions of the expression of the present invention between different forms such as a method, a device, a system, a recording medium, and a computer program are also valid as aspects of the present invention.

BRIEF DESCRIPTION OF DRAWINGS

FIG. 7 is a diagram illustrating an example of a stream of continuous data.

DESCRIPTION OF EMBODIMENT

Figure 1:
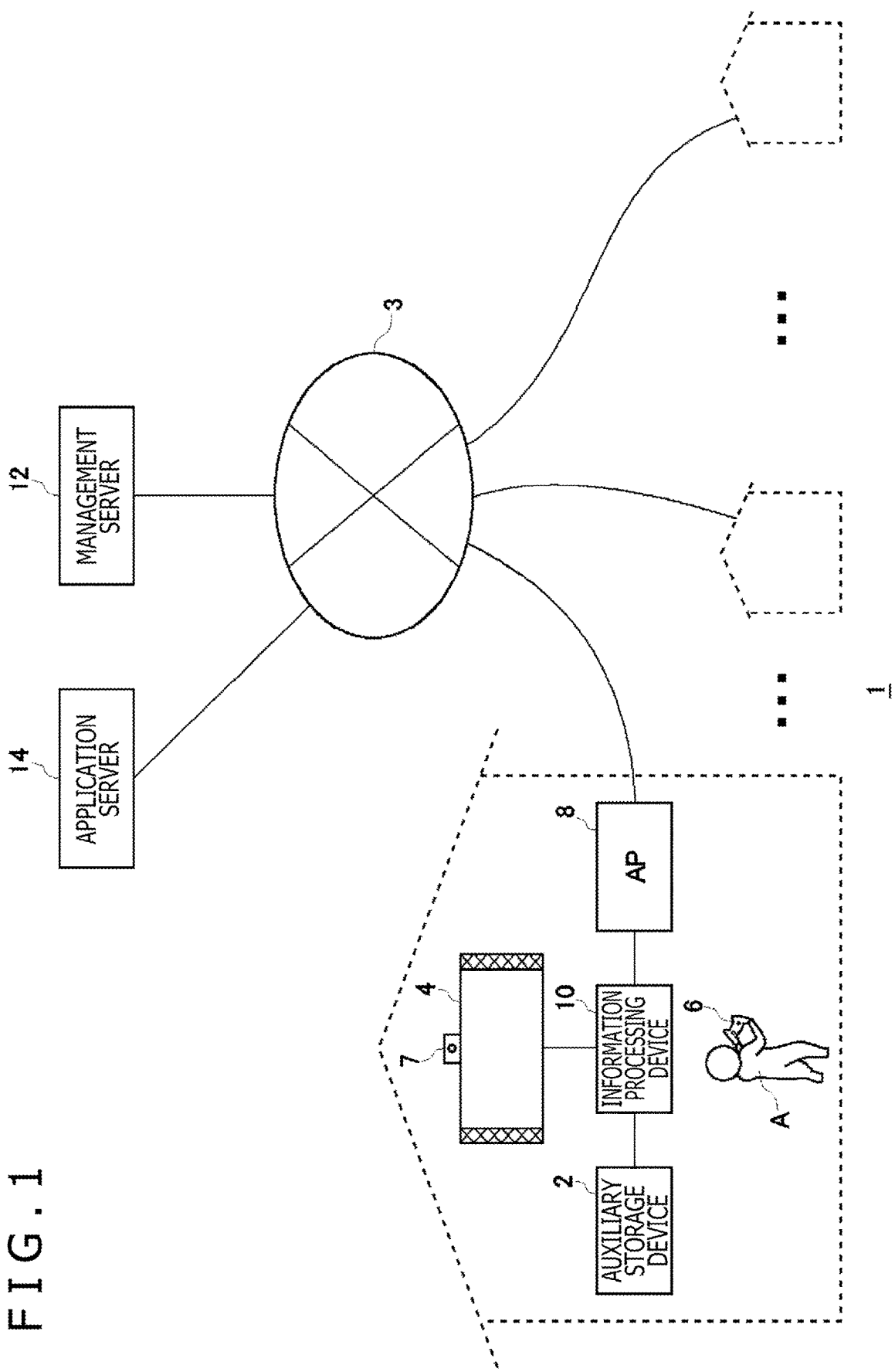
FIG. 1 is a diagram illustrating an information processing system according to an embodiment.

FIG. 1 illustrates an information processing system 1 according to an embodiment of the present invention. The information processing system 1 of the embodiment provides users with a network service that is related to at least a game. The information processing system 1 includes a plurality of information processing devices 10 operated by a plurality of users, a management server 12, and an application server 14, and these are connected to a network 3 such as the Internet. The information processing devices 10 are communicably connected to each of the management server 12 and the application server 14 on the network 3 via an access point (hereinafter referred to as an "AP") 8. FIG. 1 illustrates an information processing device 10 operated by a user A.

An input device 6 is coupled to the information processing device 10 via a wireless or wired link, and supplies operation information to the information processing device 10 upon receipt of an operation input from the user A. The information processing device 10 reflects the operation information having been received from the input device 6 into processing by system software and application software, and causes the result of the processing to be output from an output device 4. The information processing device 10 of the present embodiment is a game device that executes game software, and the input device 6 may be equipment, such as a game controller, which supplies the information processing device 10 with the operation information from the user A. Here, the information processing device 10 may have the function of executing application software other than the game software. The input device 6 includes a plurality of input units such as a plurality of push-type operation buttons, an analog stick capable of entering analog quantities, and a rotary-type button.

An auxiliary storage device 2 is a large capacity storage device such as an HDD (Hard Disk Drive) or a flash memory. The auxiliary storage device 2 may be an external storage device coupled to the information processing device 10 via a USB (Universal Serial Bus), or may be a built-in type storage device. The output device 4 may be a television set including a display for outputting images and a speaker for outputting audio. The output device 4 may be coupled to the information processing device 10 with a wired cable, or may be wirelessly connected to the information processing device 10. The camera 7 is a stereo camera and captures the space around the output device 4.

The management server 12 provides a plurality of users with the network service and collects and manages the statuses of the plurality of users. The management server 12 manages network accounts used for identifying the users who use the network service, and each of the users signs in to the network service by using his or her network account. Each user is able to, in a signed-in state, register save data for a game and a virtual prize (trophy) that the user has won during a game play, into the management server 12.

The management server 12 retains, in a user DB, profile information regarding each user, such as an icon, a nickname (online ID) on the network, and a sign-in password, in such a way as to associate the profile information with the network account of the user. The icon of the user is an avatar image expressing the user himself or herself, and a photo having been obtained by photographing the user or a picture may be used as the icon. Further, a photo or a picture that has no relation with the user may be used as the user icon. That is, the user icon is sufficient just to be an icon having been set by the user as an image expressing the user himself or herself on the network. The user uses the user icon to communicate with other users.

In the network service, the user A is able to make a friend relationship with a different user in such a way that the user A sends a friend request to the different user and the friend request is accepted by the different user. Processing for registering a friend is performed in the management server 12, and the management server 12 registers information regarding the friend in such a way as to associate the information with the network account of the user A.

The management server 12 monitors the statuses of information processing devices 10 of all users being in a signed-in state, and detects and records the changes in the statuses. In the case where a predetermined event has occurred during a game play of a certain user, the management server 12 may notify different users who have friend relationships with the user of the event as information regarding a status of the user. For example, in the case where a certain user has acquired a trophy during his or her game play, different users who have friend relationships with the user may be notified of the event in which the user has acquired the trophy. In addition, when the management server 12 has received, from a user, an acquisition request for information regarding the statuses of friends of the user, the management server 12 may send the information regarding the statuses of the friends of the user to the information processing device 10 of the user, in a consolidated manner.

The application server 14 is a server device for providing application software to the information processing devices 10. The application server 14 provides an application purchasing screen to the user A, and when the user has selected an application on the application purchasing screen, the application server 14 supplies application software to the information processing device 10 of the user A. Here, the application server 14 may provide moving image data such as a movie to the information processing devices 10. In the present embodiment, the application server 14 supplies the information processing devices 10 with a trailer for advertisement of games and movies.

Figure 2:
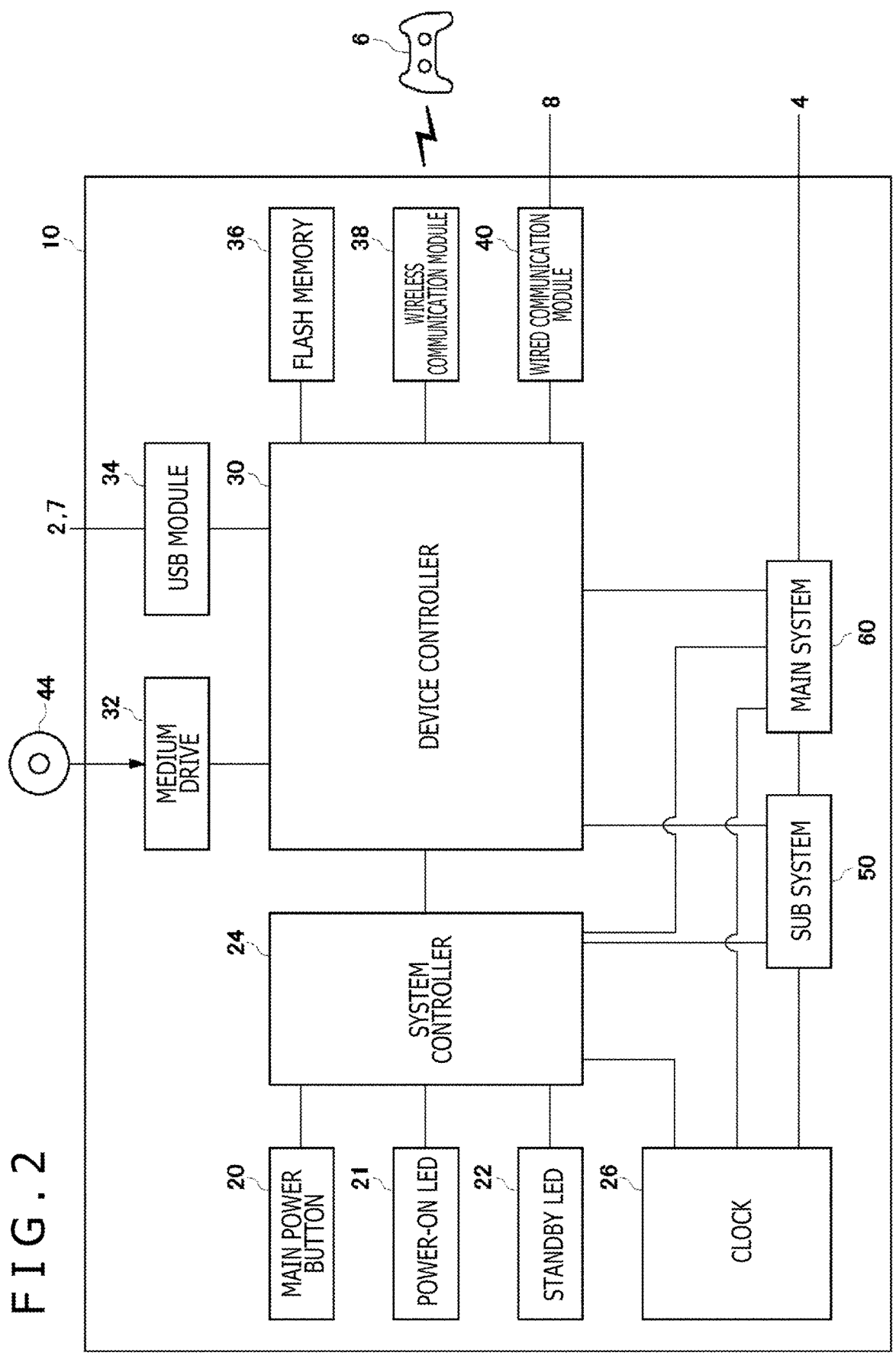
FIG. 2 is a diagram illustrating a function block of an information processing device.

FIG. 2 illustrates a function block diagram of the information processing device 10. The information processing device 10 includes a main power button 20, a power-on LED 21, a standby LED 22, a system controller 24, a clock 26, a device controller 30, a medium drive 32, a USB module 34, a flash memory 36, a wireless communication module 38, a wired communication module 40, a sub system 50, and a main system 60.

The main system 60 includes a main-CPU (Central Processing Unit), a memory and a memory controller that serve as a main storage device, a GPU (Graphics Processing Unit), and other components. The GPU is used mainly in arithmetic processing for a game program. These functions may be configured as a system-on-chip, and may be formed on a single chip. The main-CPU has the function of executing a game program recorded in the auxiliary storage device 2 or a ROM medium 44.

The sub system 50 includes a sub-CPU, a memory and a memory controller that serve as a main storage device, and other components, but not the GPU and the function of executing the game program. The number of circuit gates of the sub-CPU is smaller than the number of circuit gates of the main CPU, and the operation power consumption of the sub-CPU is smaller than the operation power consumption of the main CPU. The sub-CPU operates even while the main-CPU is in a standby state, and the processing function of the sub-CPU is limited in order to limit its power consumption to a low level.

The main power button 20 is an input unit to which an operation input from a user is made. The main power button 20 is provided on the front face of the housing of the information processing device 10, and is operated for starting or stopping power supply to the main system 60 of the information processing device 10. The power-on LED 21 is lighted upon turn-on of the main power button 20, and the standby LED 22 is lighted upon turn-off of the main power button 20.

The system controller 24 detects the press of the main power button 20 by a user. Upon press of the main power button 20 when a main power supply is in a turned-off state, the system controller 24 acquires the press operation as a "turn-on instruction," whereas upon press of the main power button 20 when the main power supply is in a turned-on state, the system controller 24 acquires the press operation as a "turn-off instruction."

The clock 26 is a real time clock and generates current day and time information to supply it to the system controller 24, the sub system 50, and the main system 60. The device controller 30 is configured as an LSI (Large-Scale Integrated Circuit) that, as a south bridge, performs delivery and receipt of information between devices. As illustrated in FIG. 2, the device controller 30 is coupled to such devices as the system controller 24, the medium drive 32, the USB module 34, the flash memory 36, the wireless communication module 38, the wired communication module 40, the sub system 50, and the main system 60. The device controller 30 absorbs the differences of electric properties and the differences of speeds of data transfer with respect to the individual devices to control the timings of data transfer.

The medium drive 32 is a drive device that drives the ROM medium 44 that is attached to the drive device and that records therein application software, such as one for games, and license information, to read programs, data, and the like from the ROM medium 44. The ROM medium 44 may be a record medium dedicated to reading, such as an optical disk, an opto-magnetic disk, or a Blu-ray disk.

The USB module 34 is a module coupled to external devices with USB cables. The USB module 34 may be coupled to the auxiliary storage device 2 and the camera 7 with USB cables. The flash memory 36 is an auxiliary storage device that configures an internal storage. The wireless communication module 38 wirelessly communicates with, for example, the input device 6 in accordance with a communication protocol such as a Bluetooth (registered trademark) protocol or an Institute of Electrical and Electronics Engineers (IEEE) 802.11 protocol. The wired communication module 40 communicates, in a wired manner, with external devices, and is connected to the network 3 via the AP 8.

Figure 3:
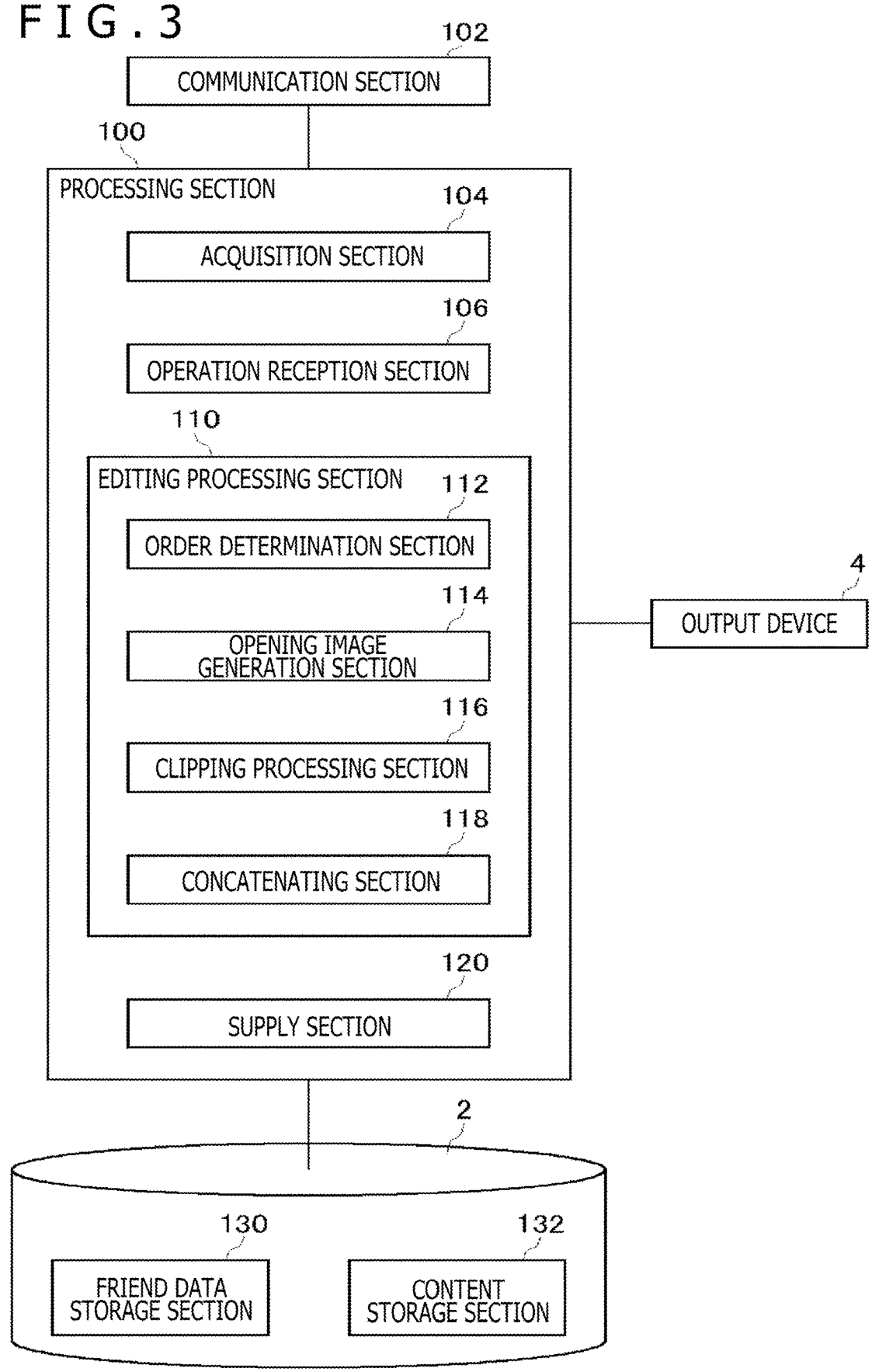
FIG. 3 is a diagram illustrating a configuration of the information processing device.

FIG. 3 illustrates a configuration of the information processing device 10. The information processing device 10 includes a processing section 100 and a communication section 102, and the processing section 100 includes an acquisition section 104, an operation reception section 106, an editing processing section 110, and a supply section 120. The editing processing section 110 has the function of generating a stream of continuous data obtained by temporally concatenating a plurality of sets of content data, and includes an order determination section 112, an opening image generation section 114, a clipping processing section 116, and a concatenating section 118.

Each of the components that are described in FIG. 3 as function blocks that perform various kinds of processing can be configured by a circuit block, a memory, and any other LSI in terms of hardware, and are implemented by system software, a game program having been loaded in the memory, and the like in terms of software. Thus, it follows that those skilled in the art understand that these function blocks can be implemented in various forms, i.e., a form of only hardware, a form of only software, and a form of the combination of those, and the implementation forms of the individual function blocks are not limited to any particular one of the above forms.

The communication section 102 is expressed as a configuration including functions of both the wireless communication module 38 and the wired communication module 40, which are illustrated in FIG. 2. The communication section 102 receives operation information regarding an operation by the user A onto the input unit of the input device 6. The operation reception section 106 receives the operation information and supplies it to the editing processing section 110. Further, the communication section 102 transmits/receives data to/from the management server 12 and the application server 14 via the AP 8.

The acquisition section 104 acquires a plurality of sets of content data from the management server 12 and/or the application server 14. In the information processing system 1, a mechanism in which, when a friend of the user A has uploaded a set of content data including a game moving image, a screen shot, and the like to the management server 12, the management server 12 supplies the uploaded set of content data to the user A is built. Thus, every time a set of content data is uploaded from a friend of the user A, the management server 12 sends the set of content data of the friend to the information processing device 10. The acquisition section 104 acquires the set of content data having been generated by the friend, and causes the set of content data to be stored in the content storage section 132.

The friend plays a game by operating his or her information processing device 10. Upon occurrence of a predetermined event during the play of the game, the information processing device 10 of the friend may automatically upload game moving images that are ones before and after the occurrence of the event, to the management server 12. For example, when the friend breaks his or her fastest lap record in a car race game, the information processing device 10 of the friend may automatically upload a game moving image in which travel scenes of a vehicle operated by the friend are recorded, to the management server 12. In addition, the friend is also able to edit, for himself or herself, the game moving image having been recorded in his or her information processing device 10, after the end of the game, and upload the edited game moving image to the management server 12.

Further, the acquisition section 104 acquires, from the application server 14, a trailer for advertisement of application and/or movies in which the user A is interested. The application server 14 may analyze preferences of the user A from content purchase histories of the user A and the like, and may send a trailer for advertisement of content matched with the preferences of the user A.

The auxiliary storage device 2 includes a friend data storage section 130 and a content storage section 132. The content storage section 132 stores a set of content data having been acquired by the acquisition section 104. The content storage section 132 preferably stores the set of content data, together with time information indicating the day and time at which the acquisition section 104 acquired the set of content data. In addition, the set of content data may include, as attribute information, time information indicating the day and time at which the set of content data was generated and content type information. The content type information indicates the type of content, and includes information indicating whether or not the content is content having been generated by a user, information regarding whether or not the content has been generated for a commercial purpose, and any other content type information.

The friend data storage section 130 stores attribute data regarding friends of the user A (hereinafter also referred to as "friend users"). The attribute data includes at least the icon of each of the friend users, and may include the nick name (online ID) of each of the friend users on the network. When the user A has made a friend relationship with a different user, the acquisition section 104 acquires attribute data including the user icon and online ID of the friend, in addition to the network account of the friend, and causes the attribute data to be stored in the friend data storage section 130 in such a way that the attribute data is associated with the network account.

Upon press of the main power button 20 when the main power supply is in a turned-off state, the system controller 24 acquires the press operation as a "turn-on instruction," and the information processing device 10 is started. Upon start of the information processing device 10, a home screen including icons for a plurality of applications is displayed.

Figure 4:
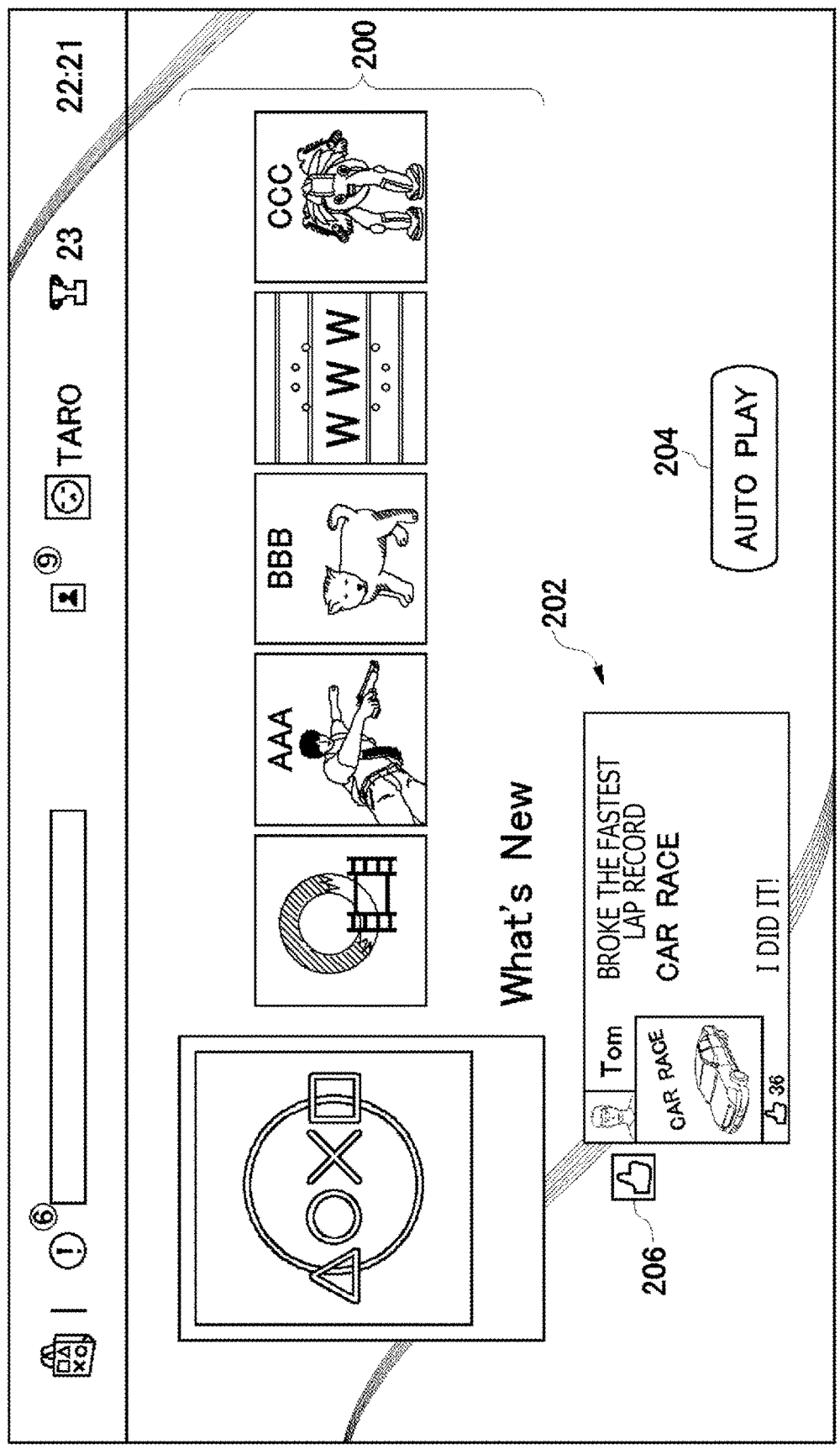
FIG. 4 is a diagram illustrating an example of a home screen.

FIG. 4 illustrates an example of the home screen. The home screen includes an icon display area 200 in which the icons for the plurality of applications are arranged in a horizontal direction. The user A scrolls the icons in the icon display area 200 in the horizontal direction by operating a left-key or a right-key of the input device 6, and selects a desired icon to start a corresponding game.

A content reproduction area 202 in which reproduction windows for pieces of content having been acquired by the acquisition section 104 are arranged in a vertical direction is provided below the icon display area 200. The user A scrolls the reproduction windows in the content reproduction area 202 in the vertical direction by operating an up-key or a down-key of the input device 6, and selects a window for the content that the user A intends to view. In the content reproduction area 202, the reproduction windows for the pieces of content having been acquired by the acquisition section 104 may be arranged up to a predetermined number.

The user A causes a set of content data to be reproduced by selecting a reproduction window and operating a decision button. Thus, in the case where a large number of reproduction windows for pieces of content exist, it takes a long time and a lot of trouble to select and reproduce the reproduction windows one by one. Thus, the information processing device 10 of the present embodiment has the function of efficiently reproducing a plurality of sets of content data, and a continuous reproduction button 204 is disposed on the home screen as a user interface for continuously reproducing a plurality of edited sets of content data. When the user A operates the continuous reproduction button 204, the operation reception section 106 receives a continuous reproduction instruction. Further, the editing processing section 110 edits sets of content data stored in the content storage section 132, and causes the edited sets of content data to be output from the output device 4. Here, the editing processing section 110 may edit the sets of content data in advance.

The editing processing section 110 edits the individual sets of content data stored in the content storage section 132, and generates a stream of continuous data obtained by temporally concatenating the edited sets of content data. Here, the editing processing section 110 may extract, as targets of editing, unreproduced sets of content data among the sets of content data stored in the content storage section 132, but the number of extractions may be limited to a predetermined number.

Figure 5:
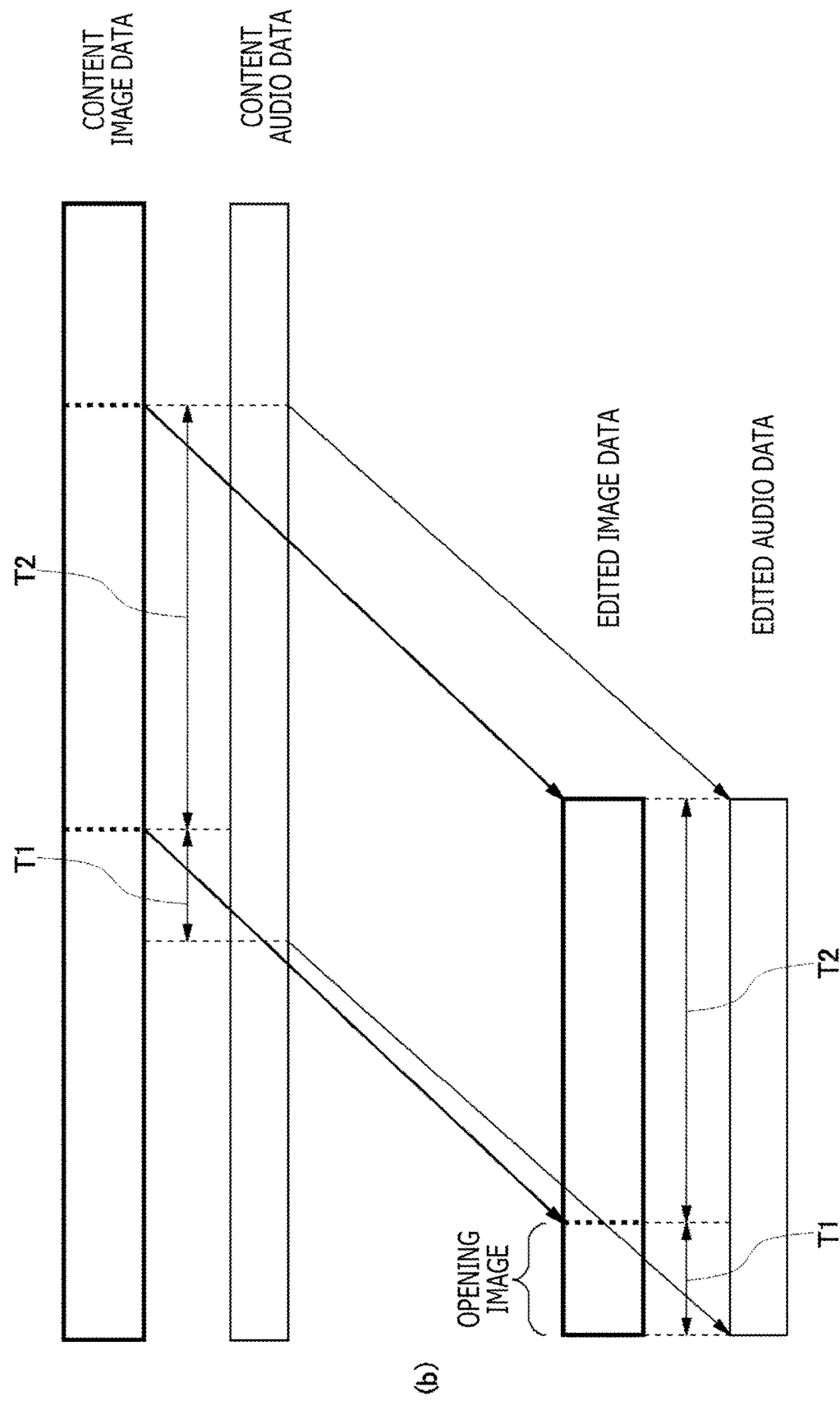
FIG. 5 depicts diagrams for describing an example of an editing method for a set of content data.

FIG. 5 is a diagram for describing an example of an editing method for a set of content data. The set of content data includes content image data and content audio data. FIG. 5(a) illustrates a pre-editing set of content data, and FIG. 5(b) illustrates a post-editing set of content data. The horizontal axis indicates a time length.

The editing processing section 110 of the present embodiment processes a plurality of sets of content data such that the time lengths of the sets of content data (the reproduction time lengths of the sets of content data) coincide with one another. The clipping processing section 116 determines a reproduction duration time of each piece of edited content. The clipping processing section 116 may determine the reproduction duration time of each piece of the edited content, according to the number of sets of content data to be temporally concatenated. In the case where the number of sets of content data to be temporally concatenated is large, the reproduction duration time of each piece of content may be determined to be relatively short, and in the case where the number of sets of content data to be temporally concatenated is small, the reproduction duration time of each piece of content may be determined to be relatively long.

Referring to FIG. 5(b), an opening image for representing the start of content is disposed at the beginning of an edited set of image data. The clipping processing section 116 thus determines a reproduction duration time of each content including an opening image. In the present example, when a reproduction duration time of the opening image is denoted by T1 and a reproduction duration time of the content image is denoted by T2, the clipping processing section 116 determines a content reproduction duration time of (T1+T2). The clipping processing section 116 temporally clips at least part of original content image data according to the determined duration time T2.

The opening image generation section 114 generates the set of opening image data for each content. As illustrated in FIG. 5(b), the time length of the opening image of each content is T1. For the trailer for advertisement, the opening image generation section 114 may clip image data having the time length of T1 from the beginning of the trailer for advertisement, as the opening image. The trailer for advertisement has a configuration with a purpose of introducing the content to a user, and thus, it is efficient to use, as the opening image, the introduction portion of the trailer as it is. The opening image generation section 114 may clip, as the opening image, image data having the time length of T1 from an original set of content data in the case where, as a result of referring to the content type information added to the original set of content data, the type of corresponding content is a predetermined type. For example, in the case of content delivered for a commercial purpose, the opening image generation section 114 clips, as the opening image, image data having the time length of T1.

Figure 6:
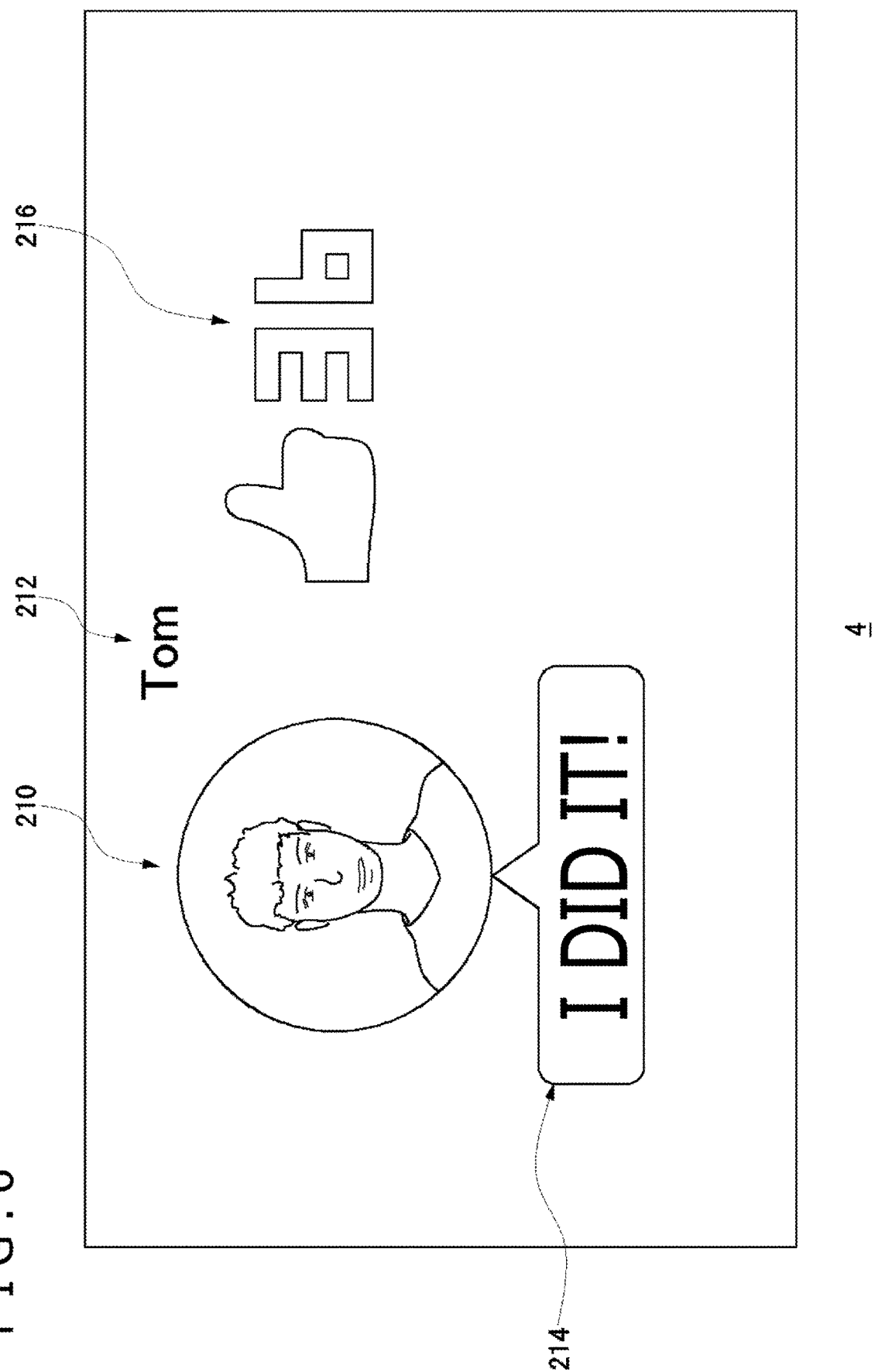
FIG. 6 is a diagram illustrating an example of an opening image.

FIG. 6 illustrates an example of an opening image generated with respect to content having been generated by a friend. To the set of content data having been generated by the friend includes, not only content type information indicating that the corresponding content is content having been generated by the user (the friend), but also information (network account) used for identifying the friend is added. The opening image generation section 114 retrieves attribute data to be associated with an edited set of content data from the friend data storage section 130 by using the network account, and generates the set of opening image data. The attribute data to be associated with the edited set of content data may be the attribute data having been added to the set of content data generated by the friend, or may be attribute data associated with the friend having generated the set of content data. Specifically, the opening image generation section 114 retrieves the icon and/or the online ID of the friend from the friend data storage section 130, and generates the set of opening image data by using the icon and/or the online ID of the friend.

In the example illustrated in FIG. 6, the opening image generation section 114 forms the opening image such that the opening image includes both a user icon 210 and an online ID 212. The user A is able to recognize the friend having generated the content by viewing the opening image prior to viewing the content image.

The opening image generation section 114 may form the opening image such that the opening image includes a comment 214 and a count number 216. The comment 214 is texts that a friend "Tom" has added to the set of content data. Here, in the case where the friend has not added any comment, the comment 214 is not displayed. The count number 216 indicates the number of users who have pressed a button "Like!" with respect to the content of the friend. When the user A has operated a button "Like!" illustrated in FIG. 4, operation information is sent to the management server 12, and the count number 216 for the content is updated.

The opening image generation section 114 may form the opening image such that the opening image includes any other information regarding the friend "Tom." For example, in the case where the content is a game moving image, information regarding a trophy having been won by Tom and a skill rate for Tom in the game may be included in the opening image. Further, the opening image generation section 114 may form the opening image such that the opening image includes the number of viewers with respect to the game moving image of Tom, information regarding the number of followers and the like, live information, and any other information. Forming the opening image such that the opening image includes such information regarding the game and the friend enables the user to have increased interest in the game and the friend, and, for example, obtain an opportunity to play a game together with the friend.

The clipping processing section 116 clips image data having the time length of T2 from the set of content image data illustrated in FIG. 5(*a*). The clipping processing section 116 basically clips temporally continuous image data, but may intermittently clip image data, provided that resulting image data has the time length of T2. The clipping processing section 116 may change the clipping method according to the type of the content in such a way as to temporally continuously clip image data in the case where the content is the game moving image, for example, and to temporally intermittently clip image data in the case where the content is the trailer for advertisement.

In the case where the content is the game moving image, the clipping processing section 116 preferably clips image data having the time length of T2 and including an occurred event. This configuration enables the user A to view an exciting scene of the game play by the friend. In the case where the content is the trailer for advertisement, the clipping processing section 16 may clip image data having the time length of T2 and being continuous to the clipped set of opening image data, or may intermittently clip image data. The concatenating section 118 generates an edited set of image data obtained by temporally concatenating the set of opening image data and the clipped set of content image data.

In addition, as illustrated in FIG. 5(*b*), for the audio data, the clipping processing section 116 clips a set of content audio data to be allocated to the set of opening image data and the clipped set of content image data. This configuration makes it possible to output content audio during the display of the opening image. Here, it is necessary for the clipped set of content image data and the clipped set of content audio data to be synchronized with each other.

Preferably, the clipping processing section 116 clips a set of content audio data having the time length of T1 and being immediately anterior to the beginning of a set of content audio data to be clipped, and allocates the clipped set of content audio data to the set of opening image data. That is, the end of the set of content audio data to be allocated to the set of opening image data is preferably continuous to the beginning of the set of content audio data. Here, a predetermined set of audio data for representing switching between pieces of content may be allocated to an initial predetermined number of frames of the opening image.

The order determination section 112 determines an order in which a plurality of sets of content data are to be concatenated. The order determination section 112 may determine the order according to acquisition day and time associated with each of the sets of content data. Here, the order determination section 112 may determine the order according to generation day and time of each of the sets of content data.

FIG. 7 illustrates an example of a stream of continuous data obtained by temporally concatenating edited sets of content data. The concatenating section 118 concatenates the edited sets of content data according to the order determined by the order determination section 112. In the example of FIG. 7, edited content A, edited content B, edited content C, edited content D, and edited content E are concatenated in the determined order. The supply section 120 supplies the stream of continuous data to the output device 4, and the output device 4 outputs the stream of continuous data that has been obtained by consolidating the plurality of sets of content data. This configuration enables the user A to view the plurality of sets of content data in a consolidated manner.

Here, the duration time of each of the sets of content data is shortened by the editing, and thus, the user A is able to efficiently recognize the outline of each of the contents.

Heretofore, the present invention has been described on the basis of the above embodiment. The above embodiment is just an example, and it is to be understood by those skilled in the art that various modified embodiments can be implemented in the combinations of the individual constituent elements and the individual processing processes of the embodiment and such modified embodiments are also included in the scope of the present invention.

In the above embodiment, when the user A has operated the continuous reproduction button 204, the editing processing section 110 generates the stream of continuous data obtained by temporally concatenating the plurality of sets of content data. In a modified embodiment, the configuration may be made such that the editing processing section 110 edits the plurality of sets of content data stored in the content storage section 132 in a screen saver mode, and thereafter, the output device 4 continuously reproduces the stream of continuous data.

In the above embodiment, it has been described that the information processing device 10 is a game device, but the information processing device 10 may be a general-purpose computer device. Further, in the above embodiment, the information processing device 10 serving as the user terminal has performed the editing processing for content, but the management server 12 may perform, for each of the users, the editing processing for content. In this case, the management server 12 can be called an information processing device for editing content, and the management server 12 may send edited sets of content data to the user terminal.

Nowadays, opportunities of delivering live broadcasts of electronic sports (e-sports) around the world are increasing. Streaming delivery on websites is common, but television broadcasts have also been made. In a venue for such e-sports, the information processing device 10 may be used to, for the purpose of introducing a plurality of participating players, edit moving images of previous plays of each of the players and display edited moving images on a large screen installed in the venue. In this case, streaming delivery of the edited moving images may be made.

INDUSTRIAL APPLICABILITY

The present invention can be applied to the field in which sets of content data are reproduced.

REFERENCE SIGNS LIST

1: Information processing system
10: Information processing device
12: Management server
14: Application server
100: Processing section
102: Communication section
104: Acquisition section
106: Operation reception section
110: Editing processing section
112: Order determination section
114: Opening image generation section
116: Clipping processing section
118: Concatenating section
120: Supply section
130: Friend data storage section
132: Content storage section

The invention claimed is:

1. An information processing device comprising:
   an acquisition section that acquires a plurality of sets of content data; and
   an editing processing section that generates a stream of continuous data obtained by temporally concatenating the plurality of sets of content data,
   wherein the editing processing section includes
   an opening image generation section that generates, for each content, a set of opening image data,
   a clipping processing section that temporally clips at least a portion of a set of content image data, and
   a concatenating section that generates an edited set of image data obtained by temporally concatenating the set of opening image data and the clipped set of content image data,
   wherein each member of the edited set of image data is arranged in a repeating pattern comprising:
      an opening image from the set of opening image data displayed for a predetermined time t1 joined with a video clip from the clipped set of content image data displayed for a predetermined time t2,
      such that each member of the edited set of image data has a combined predetermined length of t1+t2.

2. The information processing device according to claim 1, wherein the opening image generation section generates the set of opening image data by using attribute data associated with a set of content data.

3. The information processing device according to claim 1, wherein the clipping processing section clips a set of content audio data to be allocated to the set of opening image data.

4. The information processing device according to claim 1, wherein the length t1+t2 is varied inversely proportional to a total number of the sets of content data to be temporally concatenated.

5. The information processing device according to claim 1, further comprising:
   an order determination section that determines an order in which the plurality of sets of content data are to be concatenated.

6. A content editing method for editing a plurality of sets of content data, the method comprising:
   acquiring the plurality of sets of content data; and
   generating a stream of continuous data obtained by temporally concatenating the plurality of sets of content data,
   wherein the editing includes generating, for each content, a set of opening image data,
   temporally clipping at least a portion of a set of content image data, and
   generating an edited set of image data obtained by temporally concatenating the set of opening image data and the clipped set of content image data,
   wherein each member of the edited set of image data is arranged in a repeating pattern comprising:
      an opening image from the set of opening image data displayed for a predetermined time t1 joined with a video clip from the clipped set of content image data displayed for a predetermined time t2,
      such that each member of the edited set of image data has a combined predetermined length of t1+t2.

7. A non-transitory computer readable medium having stored thereon a program for a computer, comprising:
   by an acquisition section, acquiring a plurality of sets of content data; and
   by an editing processing section, editing of generating a stream of continuous data obtained by temporally concatenating the plurality of sets of content data,
   wherein the editing includes
   generating, for each content, a set of opening image data,
   temporally clipping at least a portion of a set of content image data, and
   generating an edited set of image data obtained by temporally concatenating the set of opening image data and the clipped set of content image data,
   wherein each member of the edited set of image data is arranged in a repeating pattern comprising:
      an opening image from the set of opening image data displayed for a predetermined time t1 joined with a video clip from the clipped set of content image data displayed for a predetermined time t2,
      such that each member of the edited set of image data has a combined predetermined length of t1+t2.

* * * * *